(12) United States Patent
Larkins

(10) Patent No.: US 12,167,708 B2
(45) Date of Patent: *Dec. 17, 2024

(54) VEGETATION HANGER

(71) Applicant: DriFlower, LLC, Ashland, OR (US)

(72) Inventor: Todd Chandler Larkins, Ashland, OR (US)

(73) Assignee: DriFlower, LLC, Ashland, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/197,853

(22) Filed: May 16, 2023

(65) Prior Publication Data

US 2023/0284566 A1    Sep. 14, 2023

Related U.S. Application Data

(63) Continuation of application No. 17/559,075, filed on Dec. 22, 2021, now Pat. No. 11,805,737, which is a
(Continued)

(51) Int. Cl.
*A01F 25/12*        (2006.01)
*A47G 7/04*         (2006.01)
(Continued)

(52) U.S. Cl.
CPC ............... *A01F 25/12* (2013.01); *A47G 7/04* (2013.01); *A47F 7/0078* (2013.01); *A47G 25/1471* (2013.01); *A47G 25/28* (2013.01)

(58) Field of Classification Search
CPC ....... A01F 25/12; A47G 7/04; A47G 25/1471; A47G 25/28; A47G 25/10; A47G 25/14;
(Continued)

(56) References Cited

U.S. PATENT DOCUMENTS 941,448 A   11/1909  Haglund
945,729 A   1/1910   Rangnow
(Continued)

FOREIGN PATENT DOCUMENTS

CA    2458956 A1    9/2004
CN    201533508 U   7/2010
(Continued)

OTHER PUBLICATIONS

Canadian Examiners Report issued by the Canadian Patent Office in connection with International Application No. 3,147,595, dated Oct. 26, 2023.
(Continued)

*Primary Examiner* — Devin K Barnett
(74) *Attorney, Agent, or Firm* — George Likourezos; Carter, DeLuca & Farrell LLP

(57) ABSTRACT

A vegetation hanger includes a hanger portion and a crossbar. The hanger portion includes a first aperture, a stem, and a base. The first aperture is configured for handling of the vegetation hanger. The stem includes a first end portion and a second end portion. The stem extends from the first end portion towards the second end portion and defines a second aperture configured for hanging of the vegetation hanger. The crossbar is coupled to the hanger portion and defines a linear plate having a first edge, a second edge, a first end portion, and a second end portion.

19 Claims, 4 Drawing Sheets

Related U.S. Application Data continuation of application No. 16/930,522, filed on Jul. 16, 2020, now Pat. No. 11,350,574.

(60) Provisional application No. 62/874,939, filed on Jul. 16, 2019.

(51) Int. Cl.
  *A47F 7/00* (2006.01)
  *A47G 25/14* (2006.01)
  *A47G 25/28* (2006.01)

(58) Field of Classification Search
  CPC .... A47G 25/30; A47G 25/1457; A47G 25/18; A47G 7/044; A47G 7/045; A47G 7/047; A47G 25/743; A47G 25/005; A47G 25/0692; A47G 25/32; A47G 25/34; A47G 25/36; A47G 25/48; A47G 25/50; A47F 7/0078; A47F 5/00; A47F 5/0006; A47F 7/00; A47F 7/08; B29L 2031/735; A24B 1/02; A24B 1/08; A24B 1/00; A01G 9/024
  See application file for complete search history.

(56) References Cited

U.S. PATENT DOCUMENTS

| | | | | |
|---|---|---|---|---|
| 976,531 A * | 11/1910 | Wilson | A47G 25/4061 | 223/89 |
| 1,321,997 A | 11/1919 | Duberstein | | |
| 1,461,442 A * | 7/1923 | Duberstein | A47G 25/30 | 223/92 |
| 1,515,078 A | 11/1924 | Sheee | | |
| 1,833,388 A | 11/1931 | Carmack | | |
| 1,842,886 A * | 1/1932 | Trowbridge | A47G 25/30 | D6/318 |
| 1,868,638 A | 7/1932 | Mackey | | |
| 1,886,126 A * | 11/1932 | Sessions | A47G 25/30 | D6/319 |
| 2,037,971 A | 4/1936 | Ferren | | |
| 2,099,596 A * | 11/1937 | Bruening | A47G 25/34 | 40/322 |
| 2,148,688 A * | 2/1939 | Freise | A47G 25/66 | 223/89 |
| 2,150,869 A | 3/1939 | Shafarman | | |
| 2,163,485 A * | 6/1939 | Dear | A47G 25/4038 | 223/89 |
| 2,279,777 A | 4/1942 | Dean | | |
| 2,289,729 A | 7/1942 | Robinson et al. | | |
| 2,337,828 A * | 12/1943 | Lipman | A47G 25/36 | 248/317 |
| 2,411,856 A | 12/1946 | Harding | | |
| 2,425,829 A * | 8/1947 | Rosenberg | A47G 25/28 | D6/319 |
| 2,428,240 A * | 9/1947 | Pierce | A47G 25/487 | 223/91 |
| 2,478,590 A * | 8/1949 | McKnelly | A47G 25/4061 | D6/318 |
| 2,484,449 A | 10/1949 | Fetterman | | |
| 2,546,929 A | 3/1951 | Nampa | | |
| 2,580,193 A | 12/1951 | Richterkessing | | |
| 2,585,715 A * | 2/1952 | Youngblood | A47G 25/26 | 223/98 |
| 2,586,913 A | 2/1952 | Burns | | |
| 2,589,374 A * | 3/1952 | Hannon | A47G 25/442 | 223/89 |
| 2,634,031 A | 4/1953 | Klein | | |
| 2,671,938 A | 3/1954 | Roberts | | |
| 2,692,711 A | 10/1954 | Norris et al. | | |
| 2,716,513 A | 8/1955 | Braunstein | | |
| 2,741,408 A * | 4/1956 | Brokenshire | A47G 25/34 | 223/88 |
| 2,828,897 A | 4/1958 | Gordon | | |
| 2,869,812 A * | 1/1959 | Hamel | B63H 16/06 | 114/364 |
| 2,912,149 A * | 11/1959 | Stuard | A47G 25/30 | D6/318 |
| 2,929,514 A | 3/1960 | Stewart | | |
| 3,047,196 A * | 7/1962 | Levine | A47G 25/485 | 223/96 |
| D195,017 S * | 4/1963 | Wilhelm | D6/315 | |
| 3,131,817 A | 5/1964 | Schenkler | | |
| 3,186,609 A * | 6/1965 | Patch | A47G 25/20 | 223/88 |
| 3,194,458 A | 7/1965 | Bennett | | |
| D202,954 S | 11/1965 | Hanson | | |
| 3,346,150 A | 10/1967 | Clopton | | |
| D210,259 S * | 2/1968 | Holtzman | D6/319 | |
| D210,333 S | 2/1968 | Apy | | |
| 3,378,180 A * | 4/1968 | Singer | A47G 25/743 | 223/87 |
| 3,407,979 A * | 10/1968 | Patch | A47G 25/28 | D6/319 |
| 3,430,827 A * | 3/1969 | Nelson | A47G 25/4061 | 223/89 |
| 3,535,808 A | 10/1970 | Morrish | | |
| 3,592,343 A * | 7/1971 | Swett | A47G 25/743 | 211/85.3 |
| 3,606,948 A | 9/1971 | Strang | | |
| 3,870,206 A * | 3/1975 | Feinberg | A47G 25/32 | 248/340 |
| 3,874,572 A | 4/1975 | McClenning | | |
| 3,900,181 A * | 8/1975 | Pitanis | A47F 5/0006 | 248/340 |
| D236,572 S | 9/1975 | Ostroll | | |
| D243,055 S * | 1/1977 | Blumberg | D6/315 | |
| 4,157,782 A * | 6/1979 | Mainetti | A47G 25/485 | 223/96 |
| 4,300,688 A * | 11/1981 | London | A47G 25/36 | 206/285 |
| D264,912 S | 6/1982 | Bliss et al. | | |
| 4,440,369 A | 4/1984 | Banks | | |
| D281,036 S * | 10/1985 | Martin, Jr. | D6/315 | |
| 4,586,637 A * | 5/1986 | Lemel | A47G 25/30 | 223/92 |
| 4,600,132 A * | 7/1986 | Blanchard | A47G 25/625 | 223/95 |
| 4,703,878 A | 11/1987 | Louw | | |
| 4,714,156 A * | 12/1987 | Kolton | A47G 25/14 | 211/113 |
| 4,714,183 A * | 12/1987 | Tontarelli | A47G 25/28 | 223/91 |
| 4,717,053 A | 1/1988 | Wang | | |
| 4,724,967 A | 2/1988 | Valiulis | | |
| 4,793,531 A | 12/1988 | Blanchard et al. | | |
| 4,845,602 A | 7/1989 | Lehocki | | |
| 4,871,097 A * | 10/1989 | Blanchard | A47G 25/48 | D6/326 |
| 4,881,342 A | 11/1989 | Ferguson | | |
| 5,007,562 A | 4/1991 | Brink et al. | | |
| 5,065,916 A * | 11/1991 | Fildan | A47G 25/48 | 223/91 |
| 5,069,373 A * | 12/1991 | Kolton | A47G 25/48 | 223/91 |
| 5,074,445 A | 12/1991 | Chen | | |
| 5,085,358 A * | 2/1992 | Lam | A47G 25/442 | 223/89 |
| 5,129,524 A | 7/1992 | Holman | | |
| 5,129,557 A * | 7/1992 | Kolton | A47G 25/48 | 223/91 |
| 5,161,720 A * | 11/1992 | Kolton | A47G 25/743 | D6/327 |
| D331,425 S * | 12/1992 | Rhyne | D6/315 | |
| D332,180 S | 1/1993 | Marshall et al. | | |
| 5,183,190 A * | 2/1993 | Zuckerman | A47G 25/32 | 223/89 |
| 5,288,265 A * | 2/1994 | Beason | A22B 5/06 | 452/187 |
| 5,329,728 A | 7/1994 | Ray | | |
| 5,333,409 A | 8/1994 | Mendes | | |

(56) References Cited

U.S. PATENT DOCUMENTS

| | | | |
|---|---|---|---|
| 5,337,986 A * | 8/1994 | Vollink | F16M 13/022 |
| | | | 248/219.4 |
| 5,361,949 A | 11/1994 | Petrou | |
| 5,388,354 A | 2/1995 | Marshall et al. | |
| D357,813 S | 5/1995 | Koresko | |
| 5,509,587 A * | 4/1996 | Gouldson | A47G 25/28 |
| | | | 223/91 |
| 5,520,311 A | 5/1996 | Lam | |
| 5,535,927 A | 7/1996 | Garrison | |
| 5,538,166 A * | 7/1996 | Ogawa | A47G 25/4038 |
| | | | 223/89 |
| 5,544,765 A | 8/1996 | Farbman | |
| 5,573,151 A * | 11/1996 | Fildan | A47G 25/1421 |
| | | | 40/322 |
| 5,581,936 A | 12/1996 | Belgiorno | |
| 5,615,810 A * | 4/1997 | Kolton | A47G 25/743 |
| | | | 223/87 |
| 5,813,092 A | 9/1998 | Greenfield et al. | |
| 5,826,759 A | 10/1998 | Ohsugi | |
| 5,857,597 A * | 1/1999 | Kolton | A47F 5/0006 |
| | | | 223/1 |
| 5,868,289 A | 2/1999 | Lee | |
| 5,884,422 A | 3/1999 | Marshall et al. | |
| 5,901,888 A * | 5/1999 | Schneider | A47G 25/403 |
| | | | 223/89 |
| 5,967,388 A * | 10/1999 | Kolton | A47G 25/16 |
| | | | 223/95 |
| 6,047,867 A | 4/2000 | Heiber | |
| 6,132,305 A | 10/2000 | Witherell | |
| 6,170,679 B1 * | 1/2001 | Frye | A47F 7/10 |
| | | | 211/85.3 |
| 6,170,721 B1 * | 1/2001 | Chen | A63H 3/003 |
| | | | 223/94 |
| 6,206,253 B1 * | 3/2001 | Kolton | A47G 25/743 |
| | | | 223/87 |
| 6,293,443 B1 * | 9/2001 | Nykoluk | A47G 25/4038 |
| | | | 223/89 |
| 6,298,600 B1 | 10/2001 | Feldman | |
| 6,340,238 B1 | 1/2002 | Pan | |
| 6,349,863 B1 | 2/2002 | Frye | |
| 6,389,744 B1 | 5/2002 | Pugh | |
| 6,561,358 B2 * | 5/2003 | Kolton | B65D 25/22 |
| | | | 206/583 |
| 6,641,105 B1 | 11/2003 | Hamerski | |
| 6,659,295 B1 | 12/2003 | De Land et al. | |
| 6,811,064 B2 | 11/2004 | Salem | |
| 6,817,497 B2 | 11/2004 | Grasso et al. | |
| D502,756 S | 3/2005 | Birdwell et al. | |
| 6,863,197 B1 | 3/2005 | Dirlam et al. | |
| 6,915,930 B2 * | 7/2005 | Dixon | A47G 25/50 |
| | | | 223/85 |
| 7,015,815 B1 | 3/2006 | Feibelman | |
| 7,021,507 B2 * | 4/2006 | Choi | A47G 25/32 |
| | | | 223/94 |
| 7,178,705 B1 | 2/2007 | Sutton | |
| D541,189 S * | 4/2007 | O'Connell | D11/125 |
| 7,377,409 B1 | 5/2008 | Brown | |
| 7,398,902 B1 * | 7/2008 | Sutton | A47G 25/30 |
| | | | 223/85 |
| 7,774,977 B2 | 8/2010 | Miller Shelton | |
| 7,837,074 B2 * | 11/2010 | Rude | A47G 25/32 |
| | | | 223/94 |
| 7,984,585 B1 | 7/2011 | Wu | |
| 8,276,714 B2 | 10/2012 | Broyles | |
| D680,757 S * | 4/2013 | Hyman | D6/318 |
| D711,123 S | 8/2014 | Birge | |
| 9,113,736 B1 | 8/2015 | Antler | |
| 9,295,351 B2 * | 3/2016 | Schaffer | A47F 7/19 |
| D772,584 S | 11/2016 | Debus | |
| 9,510,702 B2 * | 12/2016 | Yau | A47G 25/16 |
| 9,585,496 B2 * | 3/2017 | Strassburger | A47F 5/0006 |
| 9,782,031 B2 * | 10/2017 | Debus | A47G 25/32 |
| D806,410 S | 1/2018 | Denby et al. | |
| 10,092,121 B1 * | 10/2018 | Lopez Rodriguez | A47F 7/06 |
| D843,121 S * | 3/2019 | Boles | D6/327 |
| 10,285,524 B2 * | 5/2019 | Merandi | A47G 25/32 |
| D853,737 S | 7/2019 | Wolfe | |
| D867,770 S | 11/2019 | Wright | |
| D873,036 S * | 1/2020 | Cunningham | D6/327 |
| 10,729,264 B2 * | 8/2020 | Goldman | A47G 25/32 |
| 2002/0184799 A1 | 12/2002 | Chou | |
| 2004/0226971 A1 | 11/2004 | Detten | |
| 2005/0035159 A1 | 2/2005 | Hunt et al. | |
| 2005/0139625 A1 | 6/2005 | Gouldson | |
| 2005/0189383 A1 | 9/2005 | Weal et al. | |
| 2006/0011670 A1 * | 1/2006 | Pluchino | A47G 25/48 |
| | | | 223/85 |
| 2006/0032130 A1 | 2/2006 | Liffers et al. | |
| 2006/0226179 A1 | 10/2006 | Hsu | |
| 2007/0266627 A1 | 11/2007 | Shelton | |
| 2008/0236041 A1 | 10/2008 | Carpenter | |
| 2008/0283558 A1 | 11/2008 | Rude et al. | |
| 2011/0247185 A1 * | 10/2011 | Bolden | A47G 25/005 |
| | | | 24/716 |
| 2011/0284597 A1 | 11/2011 | Kaleta et al. | |
| 2012/0132679 A1 | 5/2012 | Gouldson | |
| 2013/0015215 A1 | 1/2013 | Coote | |
| 2013/0221041 A1 | 8/2013 | Wittenstein et al. | |
| 2013/0233992 A1 * | 9/2013 | Darre | A47G 1/164 |
| | | | 248/307 |
| 2014/0246464 A1 | 9/2014 | Zhong | |
| 2014/0367425 A1 | 12/2014 | Laibe | |
| 2016/0058210 A1 | 3/2016 | Strassburger et al. | |
| 2016/0223137 A1 | 8/2016 | Ochipa | |
| 2017/0000278 A1 * | 1/2017 | Hansen | A47G 25/32 |
| 2017/0105362 A1 | 4/2017 | Irving, Jr. | |
| 2017/0238731 A1 | 8/2017 | Davies | |
| 2017/0325614 A1 | 11/2017 | Baltz | |
| 2018/0087293 A1 | 3/2018 | Strassburger et al. | |
| 2018/0103785 A1 | 4/2018 | Goldman et al. | |
| 2018/0160833 A1 | 6/2018 | Ho | |
| 2018/0303263 A1 | 10/2018 | Jones et al. | |
| 2018/0317685 A1 | 11/2018 | Boles | |
| 2018/0325299 A1 | 11/2018 | Clark et al. | |
| 2018/0356028 A1 | 12/2018 | Fang | |
| 2019/0014936 A1 | 1/2019 | Beyda et al. | |
| 2019/0307264 A1 | 10/2019 | Carr et al. | |
| 2019/0380522 A1 | 12/2019 | Johansson | |
| 2020/0085221 A1 | 3/2020 | Riedel et al. | |
| 2020/0128988 A1 | 4/2020 | Moore et al. | |
| 2020/0245796 A1 | 8/2020 | Gilbert | |

FOREIGN PATENT DOCUMENTS

| | | |
|---|---|---|
| CN | 104621238 A | 5/2015 |
| CN | 105474854 A | 4/2016 |
| CN | 205667333 U | 11/2016 |
| CN | 206611910 U | 11/2017 |
| CN | 107896731 A | 4/2018 |
| CN | 208864010 U | 5/2019 |
| DE | 3246174 C2 | 1/1994 |
| FR | 2464638 A1 | 3/1981 |
| FR | 3062120 A1 | 7/2018 |
| JP | 2008092939 A | 4/2008 |
| JP | 4218802 B2 | 2/2009 |
| JP | 4399093 B2 | 1/2010 |
| JP | 2011010890 A | 1/2011 |
| KR | 20-2005-0002675 A | 1/2005 |
| KR | 2003821320000 Y1 | 4/2005 |
| KR | 2011 0029352 A | 3/2011 |
| KR | 101071670 B1 | 10/2011 |
| KR | 2012 0131010 A | 12/2012 |
| KR | 2017 0067056 A | 6/2017 |
| KR | 20170079314 A | 7/2017 |
| KR | 101938225 B1 | 1/2019 |
| WO | 2018150157 A1 | 8/2018 |

OTHER PUBLICATIONS

Chinese Office Action issued by the State Intellectual Property Office of People's Republic of China in connection with Interna-

(56) References Cited

OTHER PUBLICATIONS tional Application No. 202080064670.3, dated Oct. 10, 2023. (English Translation).

Chrystal Johnson: 11 How to dry herbs from your Garden, Happy Mothering natural living in a modern world Aug. 29, 2017 (Aug. 29, 2017), Retrieved from the Internet: URL:https://www.happy-mothering.com/diy-ha nging-herb-dryer/.

International Search Report and Written Opinion for Application No. PCT/US2020/042261 dated Nov. 2, 2020.

International Search Report and Written Opinion issued in corresponding International Application No. PCT/US2020/053426 dated Jan. 18, 2021, 14 pages.

International Search Report and Written Opinion issued in corresponding International Application No. PCT/US2020/054898 dated Jan. 22, 2021, 14 pages.

Chinese Office Action issued by the State Intellectual Property Office of People's Republic of China in connection with International Application No. 2020800064670.3, dated Mar. 1, 2023.

International Preliminary Report on Patentability and Written Opinion dated Apr. 12, 2022, issued in corresponding International application No. PCT/US2020/054898, 7 pages.

Chinese Office Action dated Feb. 23, 2024 Issued in Chinese Patent Application No. 202080064670.3 (12 pages).

Canadian Examination Report issued by the Canadian Patent Office in connection with International Application No. 3,147,595, dated May 6, 2024.

European Examination Report issued by the European Patent Office in connection with International Application No. 20 751 012.4, dated Oct. 14, 2024.

\* cited by examiner

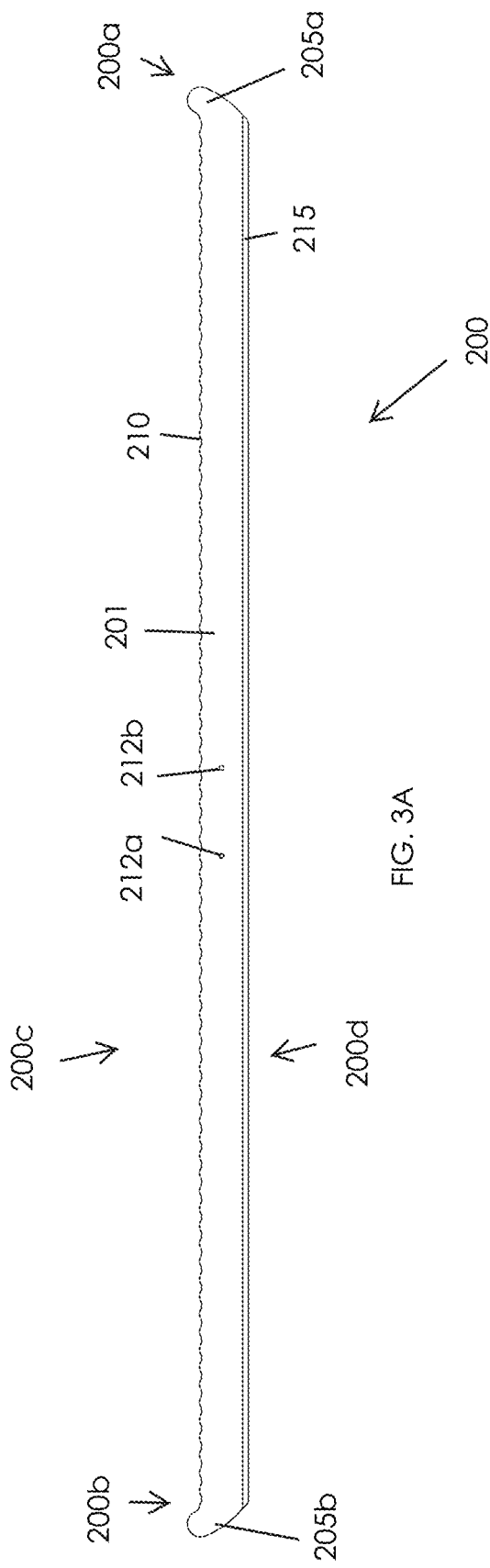
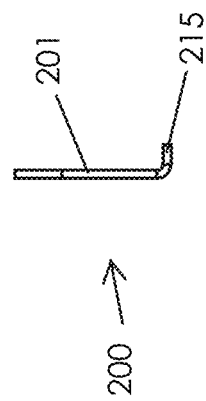
FIG. 3A
FIG. 3B

VEGETATION HANGER

CROSS-REFERENCE TO RELATED APPLICATIONS

This application is a continuation of U.S. patent application Ser. No. 17/559,075, filed on Dec. 22, 2021, which is a continuation of U.S. patent application Ser. No. 16/930,522, filed on Jul. 16, 2020, issued on Jun. 7, 2022, as U.S. Pat. No. 11,350,574, which claims the benefit of U.S. Provisional Patent Application No. 62/874,939, filed on Jul. 16, 2019, the entire contents of each of which are incorporated herein by reference.

FIELD

The present disclosure generally relates to a hanger and, more particularly, to a hanger for facilitating hang harvesting, transportation, drying and unloading of vegetation.

BACKGROUND

Vegetation such as plants, herbs, flowers, hemp and/or cannabis and other vegetation are frequently harvested and subsequently dried to produce a final product. Typically, during the drying process, vegetation is hung on plastic netting, which causes stress to the user and damages the vegetation. This process requires the vegetation to be hung one branch at a time and threaded through the netting to secure the vegetation. Removal of the vegetation also requires careful unthreading of the vegetation one branch at a time from the plastic netting. Other methods have been contemplated, such as clothing hangers, bailing wires, string and/or ropes, screens, chains, cages, fencing, and combinations thereof, all of which cause damage to the vegetation and stress to the user. Therefore, there is a need to provide a method of facilitating hang harvesting, transporting, drying, and unloading of vegetation without damaging the vegetation.

SUMMARY

The present disclosure relates to a hanger that includes a hanger portion and a crossbar coupled to the hanger portion to create a vegetation hanger to facilitate hang harvesting, transporting, drying and unloading of vegetation.

In one aspect, the present disclosure provides a vegetation hanger including a hanger portion and a crossbar. The hanger portion includes a first aperture, a stem, and a base. The first aperture is configured to permit handling of the vegetation hanger by a user. The stem includes a first end portion and a second end portion, and defines a second aperture. The second aperture is configured to permit hanging of the vegetation hanger from a support structure. The crossbar is coupled to the hanger portion and defines a linear plate having a first edge, a second edge, a first end portion, and a second end portion.

In aspects, the crossbar may include at least one ridge disposed along the first edge.

In aspects, the second edge of the cross bar may be bent at a predetermined angle relative to the crossbar.

In aspects, the predetermined angle may be 90 degrees.

In aspects, the first and second end portions of the crossbar may each include a lip.

In aspects, the crossbar may be tapered from a center point between the first and second end portions outwardly towards the first and second end portions.

In aspects, the crossbar and the hanger portion may be coupled via at least one fastener.

In aspects, the first aperture may be dimensioned to receive a hand.

In aspects, the second aperture may be configured to engage one of a bar or a wire.

In aspects, the second aperture may include a V-shaped notch.

In aspects, the vegetation hanger may be formed from one or more materials selected from metal, plastic, or composite materials.

In another aspect, the present disclosure provides a method of drying vegetation on a vegetation hanger. The method includes: hanging a vegetation hanger including a hanger portion and a crossbar on a support; hanging the vegetation on a first edge of the crossbar, the crossbar having at least one ridge disposed on the first edge to prevent movement of the vegetation; and carrying the vegetation hanger via a first aperture of the hanger portion, to transport the vegetation from a first location to a second location.

In aspects, the method may further include assembling the vegetation hanger by coupling the hanger portion to the crossbar.

In aspects, the hanger portion may be coupled to the crossbar with at least one fastener.

In aspects, carrying the vegetation hanger from a first location to a second location may include transporting the vegetation from a point of harvest to a final drying location.

BRIEF DESCRIPTION OF DRAWINGS

FIG. 3A is a front view of a crossbar of the vegetation hanger of FIG. 1;

FIG. 3B is a side view of the crossbar of the vegetation hanger of FIG. 1.

DETAILED DESCRIPTION

Figure 1:
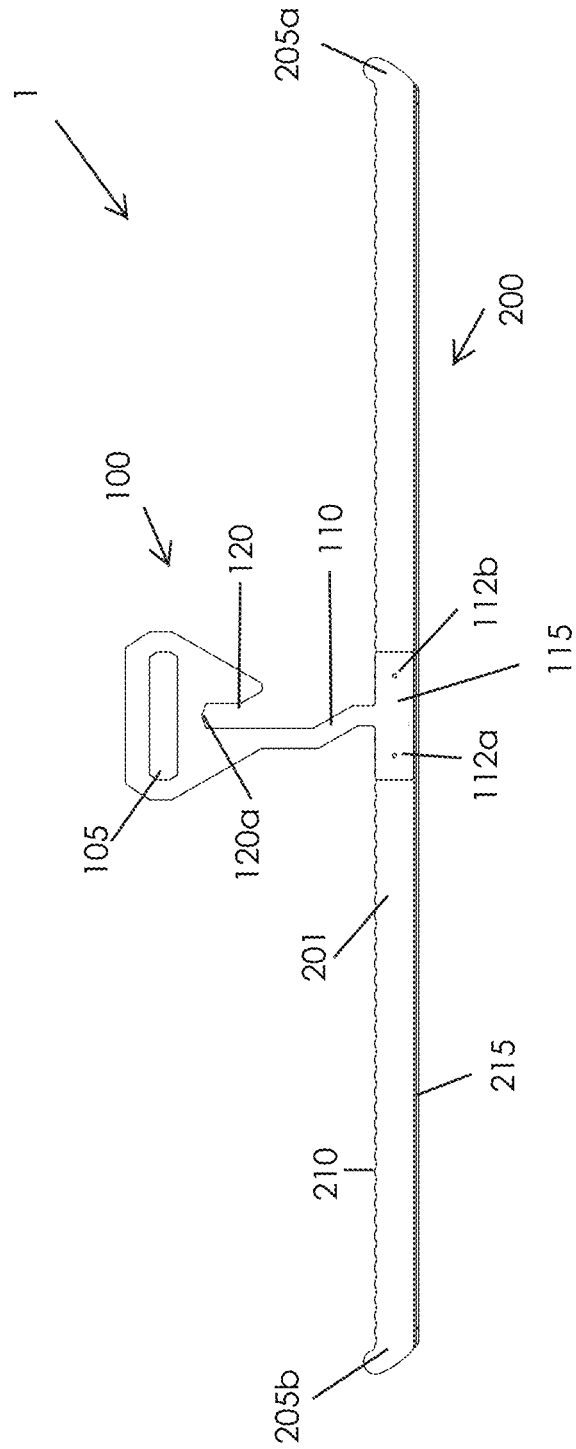
FIG. 1 is a front view of a vegetation hanger in accordance with the present disclosure.

Embodiments of the presently disclosed vegetation hanger are described in detail with reference to the drawings, in which like reference numerals designate identical or corresponding elements in each of the several views.

Referring to FIG. 1, a vegetation hanger provided in accordance with the present disclosure is shown generally identified by reference numeral 1. The vegetation hanger 1 generally includes a hanger portion 100 and a cross bar portion 200 coupled to the hanger portion 100.

Figure 2:
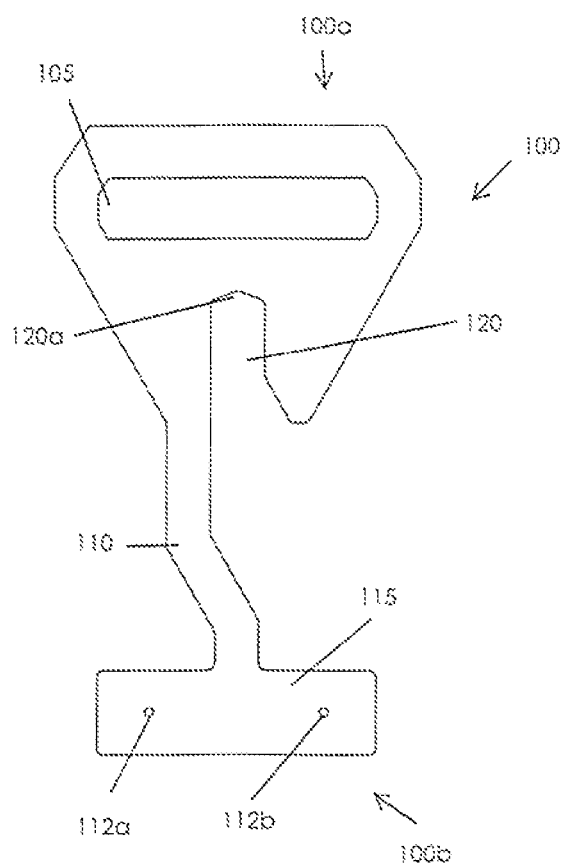
FIG. 2 is a front view of a hanger portion of the vegetation hanger of FIG. 1.

As seen in FIG. 2, the hanger portion 100 has a first end portion 100a and a second end portion 100b. The hanger portion 100 includes a first aperture 105, a stem 110, and a base 115. The first aperture 105 is disposed at the first end portion 100a of the hanger portion 100 and is configured to facilitate handling of the vegetation hanger 1 by a user. The first aperture 105 may be dimensioned to receive a hand or one or more fingers of a user. The hanger portion 100 may be fabricated from a lightweight metal, plastic, composite material, or any other suitable material. The first end portion 100a may be dipped in a rubber composition, or any other suitable material to provide a comfortable grip using the first aperture. The first aperture 105 is further configured to receive a zip tie or any suitable fasteners. A body of the hanger portion 100 is configured to receive a label disposed along the body of the hanger portion 100, in which both the zip tie and the label contain harvest information such as, for example, name of harvest, strain, and/or date and time of harvest, in order to facilitate labeling of the harvest.

The stem 110 extends the first end portion 100a towards a second end portion 100b defining a second aperture 120. The second aperture 120 is configured to facilitate hanging of the vegetation hanger 1 on a support or mounting surface, such as, for example, a pole, horizontal bar, hook, or rack. The second aperture 120 may be dimensioned to receive a specific support, such as for example a horizontal bar with a rectangular dimension. As another example, the second aperture 120 may have a top end portion that may include a V-shaped notch 120a at the top of the second aperture 120 to facilitate the use of the vegetation hanger 1 on wire, string, rope, plastic netting, chain, cage or fencing.

The base 115 of the hanger portion 100 is disposed at the second end portion 100b and may be coupled to the crossbar 200. The base 115 may be coupled to the crossbar 200 by ultrasonic welding, magnets, adhesive, cord, or fasteners 112a, 112b as shown. The fasteners 112a, 112b may be bolts, screws, or any other suitable fasteners. The base 115, when coupled to the crossbar 200, is dimensioned to be flush with the crossbar 200.

With reference to FIGS. 3A and 3B, the crossbar 200 includes a linear plate 201 configured to facilitate the hanging of vegetation thereon. The linear plate 201 includes a first end portion 200a and second end portion 200b, a top edge 200c, and bottom edge 200d. At least a portion of top edge 200c of the linear plate 201 includes at least one ridge, or alternatively as shown, a serrated or textured surface including a series or plurality of ridges 210, disposed along the top edge 200c. The series of ridges are configured to prevent vegetation from sliding off the crossbar 200 and to provide organization of the vegetation on the series of ridges 210. The linear plate 201 may include openings 212a, 212b to receive the fasteners 112a, 112b to couple the crossbar 200 to the hanging portion 100. The linear plate 201 includes one or more lips 205a, 205b disposed on the first and second end portions 200a, 200b, respectively. The lips 205a, 205b are configured to prevent unintended lateral movement of the vegetation off the first and second end portions 200a, 200b. When intended, lateral movement of all the vegetation hung on the crossbar 200 at once may be initiated by a user.

With reference to FIG. 3B, the bottom edge 200d is configured to be bent to a predetermined angle such as, for example, 90 degrees, relative to the linear plate 201 to provide additional strength to the linear plate 201 in carrying vegetation on the linear plate 201.

The linear plate 201 may be fabricated at any suitable length, which, as non-limiting examples, may be one of 21", 41", or 61" to accommodate different open spaces, the amount of vegetation to be dried, and the support of vegetation within a drying system. The crossbar 200 may be fabricated from a lightweight metal, plastic, composite material, or any other suitable material. The vegetation hanger 1 may be configured to be flat providing a minimal thickness to allow for stacking and storage of multiple vegetation hanger(s). It should be understood that the hanger portion 100 and the crossbar 200 may be fabricated into a single unit, instead of being two components coupled to one another.

Figure 4:
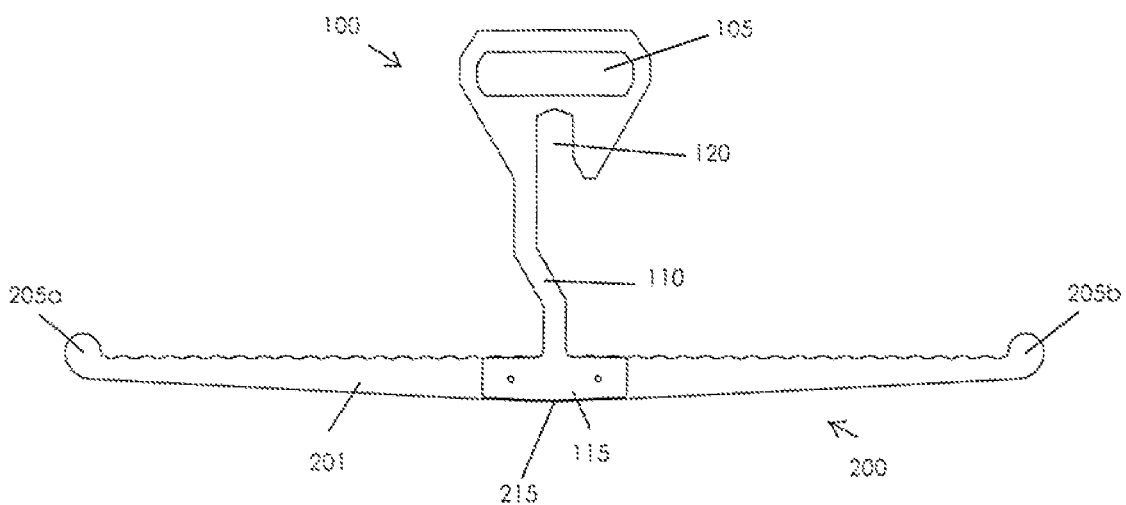
FIG. 4 is a front view of another exemplary vegetation hanger in accordance with the present disclosure.

With reference to FIG. 4, the linear plate 201 may be configured to be tapered in two directions from a center point 215 between the first end portion 200a and the second end portion 200b outwardly towards each of the first end portion 200a and the second end portion 200b.

In operation to dry vegetation, the vegetation hanger 1, including the hanger portion 100 and the crossbar 200, is hung on a support or a mounting surface at the point of harvest. The vegetation may be cut (e.g., to about 24" in length) and hung along the top edge 200c of the crossbar 200. Each piece of harvested vegetation can be placed between adjacent ridges of the series of ridges 210 to prevent individual movement of the vegetation. Once all the vegetation has been placed on the crossbar 200 of the vegetation hanger 1, the vegetation hanger 1 may be carried (e.g., by a user) via the first aperture 105 from the point of harvest to the final drying location.

While several embodiments of the disclosure have been detailed above and are shown in the drawings, it is not intended that the disclosure be limited thereto, as it is intended that the disclosure be as broad in scope as the art will allow and that the specification be read likewise. Therefore, the above description and accompanying drawings should not be construed as limiting, but merely as exemplifications of particular embodiments. Those skilled in the art will envision other modifications within the scope and spirit of the claims appended hereto.

What is claimed is:

1. A vegetation hanger, comprising:
a hanger portion, including:
a top end portion including an upper section, a mid section, and a lower section, the upper section defining a first aperture defining a handle, and the lower section of the top end portion including a first lower portion and a second lower portion separated and spaced apart from each other by a second aperture defined between the first lower portion and the second lower portion, the second aperture configured to permit hanging the vegetation hanger from a support structure,
wherein opposed side edges of the top end portion taper downwardly from the upper section to a bottom portion of the lower section, such that the upper section of the top end portion is wider than the lower section of the top end portion; and
an extension member extending downwardly from the first lower portion of the lower section, the extension member including a straight upper portion and an angled lower portion that is slanted relative to the straight upper portion, and
a crossbar extending from the extension member of the hanger portion and configured to support vegetation thereon, the crossbar including:
a serrated upper edge, a bottom edge, a first end portion, and a second end portion, the first end portion including a first lip and the second end portion including a second lip,
wherein the serrated upper edge defines a plurality of ridges configured to prevent the vegetation from sliding off the crossbar.

2. The vegetation hanger according to claim 1, wherein the extension member includes a stem and a base extending from a bottom end portion of the stem.

3. The vegetation hanger according to claim 1, wherein at least one of the first lip or the second lip protrudes upwardly from the serrated upper edge.

4. The vegetation hanger according to claim 1, wherein the first aperture forms a substantially elongated oval shape.

5. The vegetation hanger according to claim 1, wherein the crossbar is undulating along substantially an entire length of the serrated upper edge.

6. The vegetation hanger according to claim 1, wherein the vegetation hanger is fabricated from at least one of metal, plastic, or a composite material.

7. The vegetation hanger according to claim 1, wherein the second aperture defines a longitudinal axis that intersects a central portion of the first aperture and a central portion of the crossbar.

8. The vegetation hanger according to claim 1, wherein the plurality of ridges of the serrated upper edge are arcuate.

9. The vegetation hanger according to claim 1, wherein the first aperture has a length extending parallel with a length of the crossbar, and the second aperture has a length that is perpendicular to the length of the crossbar.

10. A vegetation hanger, comprising:
- a hanger portion, including:
    - a top end portion including an upper section, a mid section, and a lower section, the upper section defining a first aperture defining a handle, and the lower section of the top end portion including a first lower portion and a second lower portion separated and spaced apart from each other by a second aperture defined between the first lower portion and the second lower portion, the second aperture configured to permit hanging the vegetation hanger from a support structure, wherein opposed side edges of the top end portion taper downwardly from the upper section to a bottom portion of the lower section, such that the upper section of the top end portion is wider than the lower section of the top end portion; and
    - an extension member extending downwardly from the first lower portion of the lower section of the top end portion, and
- a crossbar extending from the extension member of the hanger portion and configured to support vegetation thereon, the crossbar including:
    - a serrated upper edge, a bottom edge, a first end portion, and a second end portion, the first end portion including a first lip and the second end portion including a second lip,
- wherein the serrated upper edge defines a plurality of ridges configured to prevent the vegetation from sliding off the crossbar.

11. The vegetation hanger according to claim 10, wherein the extension member includes a stem and a base extending from a bottom end portion of the stem.

12. The vegetation hanger according to claim 10, wherein the extension member includes a straight upper portion and an angled lower portion that is slanted relative to the straight upper portion.

13. The vegetation hanger according to claim 10, wherein at least one of the first lip or the second lip protrudes upwardly from the serrated upper edge.

14. The vegetation hanger according to claim 10, wherein the first aperture forms a substantially elongated oval shape.

15. The vegetation hanger according to claim 10, wherein the crossbar is undulating along substantially an entire length of the serrated upper edge.

16. The vegetation hanger according to claim 10, wherein the second aperture defines a longitudinal axis that intersects a central portion of the first aperture and a central portion of the crossbar.

17. The vegetation hanger according to claim 10, wherein the plurality of ridges of the serrated upper edge are arcuate.

18. The vegetation hanger according to claim 10, wherein the first aperture has a length extending parallel with a length of the crossbar, and the second aperture has a length that is perpendicular to the length of the crossbar.

19. A vegetation hanger, comprising:
- a hanger portion, including:
    - a top end portion including an upper section, a mid section, and a lower section, the upper section defining a first aperture defining a handle, and the lower section of the top end portion including a first lower portion and a second lower portion separated and spaced apart from each other by a second aperture defined between the first lower portion and the second lower portion, the second aperture configured to permit hanging the vegetation hanger from a support structure, wherein opposed side edges of the top end portion taper downwardly from the upper section to a bottom portion of the lower section, such that the upper section of the top end portion is wider than the lower section of the top end portion; and
    - an extension member extending downwardly from the first lower portion of the lower section of the top end portion, and
- a crossbar extending from the extension member of the hanger portion and configured to support vegetation thereon, the crossbar including:
    - a first edge, a second edge, a first end portion, a second end portion, and a center point disposed between the first end portion and the second end portion, wherein the first edge including at least one ridge disposed along the first edge, the first end portion including a first lip, and the second end portion including a second lip.

* * * * *